(12) United States Patent
Cherubini et al.

(10) Patent No.: US 11,038,984 B2
(45) Date of Patent: Jun. 15, 2021

(54) DATA PREFETCHING FOR LARGE DATA SYSTEMS

(71) Applicant: International Business Machines Corporation, Armonk, NY (US)

(72) Inventors: Giovanni Cherubini, Rueschlikon (CH); Jens Jelitto, Rueschlikon (CH); Vinodh Venkatesan, Horgen (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/550,389

(22) Filed: Aug. 26, 2019

(65) Prior Publication Data

US 2019/0379762 A1   Dec. 12, 2019

Related U.S. Application Data

(63) Continuation of application No. 14/749,912, filed on Jun. 25, 2015, now Pat. No. 10,397,368.

(51) Int. Cl.
*G06F 15/16* (2006.01)
*H04L 29/08* (2006.01)
*G06N 7/00* (2006.01)
*G06N 20/00* (2019.01)

(52) U.S. Cl.
CPC .......... *H04L 67/327* (2013.01); *G06N 7/005* (2013.01); *G06N 20/00* (2019.01); *H04L 67/1097* (2013.01); *H04L 67/2847* (2013.01)

(58) Field of Classification Search
CPC ............. H04L 67/327; H04L 67/2847; H04L 67/1097; G06N 20/00; G06N 7/005

USPC ........ 709/227, 203, 213, 219; 711/137, 167, 711/119, 122, 126, 162
See application file for complete search history.

(56) References Cited

U.S. PATENT DOCUMENTS

| 5,889,993 A * | 3/1999 | Kroeger ............. G06F 12/0862 717/128 |
| 6,385,641 B1 * | 5/2002 | Jiang ...................... H04L 29/06 709/203 |
| 7,165,147 B2 * | 1/2007 | Ting ..................... G06F 12/121 707/999.2 |
| 8,463,825 B1 | 6/2013 | Harty et al. |

(Continued)

OTHER PUBLICATIONS

Naftali Tishby et al. The information bottleneck method. archived in arXiv:physics/0004057 [physics.data-an] Apr. 2000. p. 1-16, dated Sep. 30, 1999.

(Continued)

*Primary Examiner* — Thuong Nguyen
(74) *Attorney, Agent, or Firm* — Daniel P. Morris; Otterstedt, Wallace & Kammer, LLP

(57) ABSTRACT

The present invention is notably directed to a computer-implemented method of accessing data by an application. The method comprises detecting an application that is accessing an initial file stored in a storage system; fetching an application model of the detected application, the application model comprising an association between access patterns of the detected application when accessing first files with first metadata information of the said first files; identifying one or more second files stored in the storage system, the identified one or more second files having second metadata information that are similar to the first metadata information; and prefetching the identified one or more second files.

13 Claims, 4 Drawing Sheets

(56) References Cited

U.S. PATENT DOCUMENTS

| | | | |
|---|---|---|---|
| 8,732,355 B1 | 5/2014 | Chan et al. | |
| 8,935,480 B1* | 1/2015 | Chien | H04L 67/2857 711/126 |
| 10,397,368 B2 | 8/2019 | Cherubini et al. | |
| 2005/0018152 A1* | 1/2005 | Ting | G06F 12/0862 353/121 |
| 2011/0103393 A1* | 5/2011 | Meier | H04W 28/08 370/401 |
| 2011/0238775 A1* | 9/2011 | Wu | G06F 16/188 709/213 |
| 2012/0323829 A1* | 12/2012 | Stokes | G06K 9/6224 706/12 |
| 2013/0173562 A1 | 7/2013 | Alspector et al. | |
| 2013/0212349 A1* | 8/2013 | Maruyama | G06F 16/11 711/167 |
| 2013/0346703 A1* | 12/2013 | McCauley | G06F 12/0862 711/137 |
| 2014/0149668 A1* | 5/2014 | Chaudhary | G06F 12/0862 711/119 |
| 2014/0188868 A1 | 7/2014 | Hunter et al. | |
| 2014/0207956 A1 | 7/2014 | Musial et al. | |
| 2014/0297316 A1 | 10/2014 | Noordvyk | |
| 2014/0379639 A1* | 12/2014 | Gasser | H04L 67/2842 707/610 |
| 2015/0249640 A1* | 9/2015 | Yacoub | G06F 40/40 709/203 |
| 2015/0281390 A1* | 10/2015 | Kovvuri | H04L 67/2842 709/203 |
| 2016/0189049 A1* | 6/2016 | Silvestri | H04W 4/029 706/52 |
| 2016/0217176 A1* | 7/2016 | Haviv | G06F 16/174 |
| 2016/0381176 A1* | 12/2016 | Cherubini | H04L 67/1097 709/219 |
| 2018/0024853 A1* | 1/2018 | Warfield | G06F 9/45558 718/1 |

OTHER PUBLICATIONS

Prashanta Kumar Patra, File Access Prediction Using Neural Networks. IEEE Transactions on Neural Networks, vol. 21, No. 6, Jun. 2010. p. 869-882.

Ahmed Amer, File Access Prediction with Adjustable Accuracy. Performance, Computing, and Communications Conference, 2002. 21st IEEE International. p. 131-140.

Thomas M. Kroeger, The Case for Efficient File Access Pattern Modeling. Hot Topics in Operating Systems, 1999. Proceedings of the Seventh Workshop on Mar. 30, 1999. p. 14-19.

Houjun Tang et al. Improving Read Performance with Online Access Pattern Analysis and Prefetching, Aug. 2014 Conference Paper, Euro-Par 2014 Parallel Processing, archived in Lecture Notes in Computer Science vol. 8632, 2014, pp. 246-257.

Jong Youl Choi, Mining Hidden Mixture Context With ADIOS-P To Improve Predictive Pre-fetcher Accuracy. 2012 IEEE, p. 1-8.

James Griffioen, Reducing File System Latency using a Predictive Approach. Proceeding USTC'94 Proceedings of the USENIX Summer 1994 Technical Conference on USENIX Summer 1994 Technical Conference. p. 1-11.

Paul J. Otterstedt, List of IBM Patents or Patent Applications Treated as Related, Sep. 12, 2019, pp. 1-2.

* cited by examiner

DATA PREFETCHING FOR LARGE DATA SYSTEMS

CROSS-REFERENCE TO RELATED APPLICATION

This application is a continuation of U.S. patent application Ser. No. 14/749,912 filed Jun. 25, 2015, the complete disclosure of which is expressly incorporated herein by reference in its entirety for all purposes.

BACKGROUND

Embodiments of the invention relate in general to the field of prefetching data from a storage system.

Big data systems comprise applications that run on large batches of datasets, e.g., astronomical data repositories, video surveillance systems, medical data repositories, financial transaction logs, etc. In such systems, data that have not been accessed for long periods of time, also referred to as cold data, are typically stored on cheaper energy efficient storage media such as tapes. In systems where the amount of cold data is significant, the energy and infrastructure cost savings realized can be significant.

However, accessing data from such media is also usually slower and this implies a considerable drop in the performance of applications running on data stored in these media.

Prefetching data to faster media can hide the latency and improve performance. Many current state-of the-art systems do employ data prefetching schemes which use data access history to be able to predict data that will be accessed in the near future.

Consider, for example, a system where the accesses to each file in the system are recorded, which is then used to build a model to predict what files will be accessed next given that a file F is accessed currently. In small systems, there is an implicit assumption that the accesses following, and preceding, the access to each file F in the system can be observed. If, for each file F, the statistics of what file is accessed next is known, then predicting accesses becomes feasible and prefetching is effective.

However, in big data systems, due to their sheer size, reliable statistics of accesses following each file may be not available. This is because each file may be not accessed enough number of times to maintain reliable statistics. In fact, for most files, each time a file is accessed, it is most likely the first time it is accessed in its lifetime, and after subsequent accesses in the near future, it may never be accessed again. This renders the above-discussed data prefetching schemes ineffective in such systems, e.g. big data systems.

SUMMARY

According to a first aspect, the present invention is embodied as methods for accessing data by an application. Such methods comprise detecting an application that is accessing an initial file stored in a storage system. The methods also comprise fetching an application model of the detected application, the application model comprising an association between access patterns of the detected application when accessing first files with first metadata information of the said first files. The methods further comprise identifying one or more second files stored in the storage system, the identified one or more second files having second metadata information that are similar to the first metadata information. The methods moreover comprise prefetching the identified one or more second files.

The methods may further comprise, before the detection of the application occurs, building the application model of the detected application based on access patterns of the detected application when accessing first files with first metadata information of the said first files.

The methods may additionally comprise that the application model of the detected application is built by a machine learning algorithm on computing correlations between access patterns of the detected application accessing first data with first metadata of said first data that is accessed.

In addition, the machine learning algorithm may be an agglomerative information bottleneck algorithm.

Prefetching the identified one or more second files may further comprise associating a prediction confidence to each second file to be prefetched and prefetching second files associated with a prediction confidence that exceeds a predetermined confidence threshold.

Identifying the one or more second files may further comprise determining, for each second file to be prefetched, a degree of similarity between its second metadata information and metadata information of the initial file, and prefetching the identified one or more second files further comprises prefetching the identified one or more second files that exceeds a predetermined degree of similarity.

Identifying the one or more second files may further comprise associating a probability to be accessed in a next time period to each second file to be prefetched, and prefetching the identified one or more second files further comprises prefetching the identified one or more second files associated with a probability that exceeds a predetermined probability threshold.

Prefetching the identified one or more second files may further comprises computing, for each second file to be prefetched, a decision to prefetch when a condition $$\frac{p(Fi)}{\sum_j p(Fj)} \rho > t$$

is satisfied, wherein p(Fj) is the probability to be accessed in a next time period of the identified one or more second files, ρ is a percentage of free cache, and t is a predetermined value of a threshold.

Metadata associated with a file may include at least one among data owner, data owner's group, data path, data encoding, date of creation of the data, date of last modification of the data, date of last access of the data.

Metadata may further comprise domain-dependent metadata.

According to another aspect, the invention is embodied as a computer-implemented system for accessing data by an application. The system comprises a detector module for detecting an application that is accessing an initial file stored on a storage system. The system further comprises an application model database that stores an application model of the detected application, the application model comprising an association between access patterns of the detected application when accessing first files with first metadata information of the first files. The system also comprises an access pattern predictor that identifies one or more second files stored in the storage system, the identified one or more second files having second metadata information that are similar to the first metadata information. The system additionally comprises a prefetch module for prefetching the identified one or more second files, and a memory for storing the identified one or more second files prefetched.

The access pattern predictor may associate a prediction confidence to each second file to be prefetched and the prefetch module prefetches each second files associated with a prediction confidence that exceeds a predetermined confidence threshold.

The access pattern predictor may further determine, for each second file to be prefetched, a degree of similarity between its second metadata information and metadata information of the initial file, and the prefetch module prefetches second files that exceeds a predetermined degree of similarity.

The access pattern predictor may also associate, to each second file to be prefetched, a probability to be accessed in a next time period, and the prefetch module prefetches second files associated with a probability that exceeds a predetermined probability threshold.

The access pattern predictor may further compute, for each second file to be prefetched, a decision to prefetch when a condition $$\frac{p(Fi)}{\sum_j p(Fj)} \rho > t$$

is satisfied, wherein p(Fi) is the probability to be accessed in a next time period of the identified one or more second files, ρ is a percentage of free cache, and t is a predetermined value of a threshold, and the prefetch module prefetches second files associated with a decision to prefetch.

The system may further comprise machine learning that computes correlations between access patterns of the detected application accessing first data with first metadata of said first data that is accessed and builds an application model from the computed correlations.

The machine learning may compute the correlation with an agglomerative information bottleneck algorithm.

The machine learning may continuously update the application model by comparing the identified access patterns with the actual access patterns.

The system may further comprise metadata information including at least one among data owner, data owner's group, data path, data encoding, date of creation of the data, date of last modification of the data, date of last access of the data, domain-dependent metadata.

According to a final aspect, the invention can be embodied as a computer program product for accessing data by an application. The computer program product comprises a computer readable storage medium having program instructions embodied therewith, the program instructions executable by a computerized system, to cause detecting an application that is accessing an initial file stored on a storage system. The computer program further comprise fetching an application model of the detected application, the application model comprising an association between access patterns of the detected application when accessing first files with first metadata files of the first files. The computer program also comprise identifying one or more second files stored in the storage system, the identified one or more second files having second metadata files that are similar to the first metadata file, and prefetching the identified one or more second files.

Systems, products and methods embodying the present invention will now be described, by way of non-limiting examples, and in reference to the accompanying drawings.

BRIEF DESCRIPTION OF THE DRAWINGS

These and other objects, features and characteristics of the present invention will become more apparent to those skilled in the art from the following detailed description in conjunction with the appended claims and drawings, all of which form a part of this specification. In the drawings:

Similar or functionally similar elements in the figures have been allocated the same reference signs if not otherwise indicated.

DETAILED DESCRIPTION

References in this specification to "an embodiment", "one embodiment", or the like, means that the particular feature, structure, or characteristic being described is included in at least one embodiment of the present invention. Occurrences of such phrases in this specification do not all necessarily refer to the same embodiment, however.

The inventors have realized that it would be advantageous to create an association of access patterns of an application to file metadata instead of maintaining access history for each individual file as it is currently performed in the art with prefetching schemes in big data systems. For the sake of clarity, an access pattern definition is, but is not limited to, a sequence of memory addresses being read and written, e.g. sequential read of memory, random write on memory.

For example, when an application (noted hereinafter A) accesses a file (noted hereinafter F) with a certain access pattern (noted hereinafter PA(F)), this access pattern is associated not with the file F itself but with metadata (noted hereinafter M(F)) of the file. When another file F', which has similar metadata as file F, is accessed by the application A, its access pattern can be predicted based on its metadata M(F') even though there may not be any access history available for that particular file.

Figure 1:
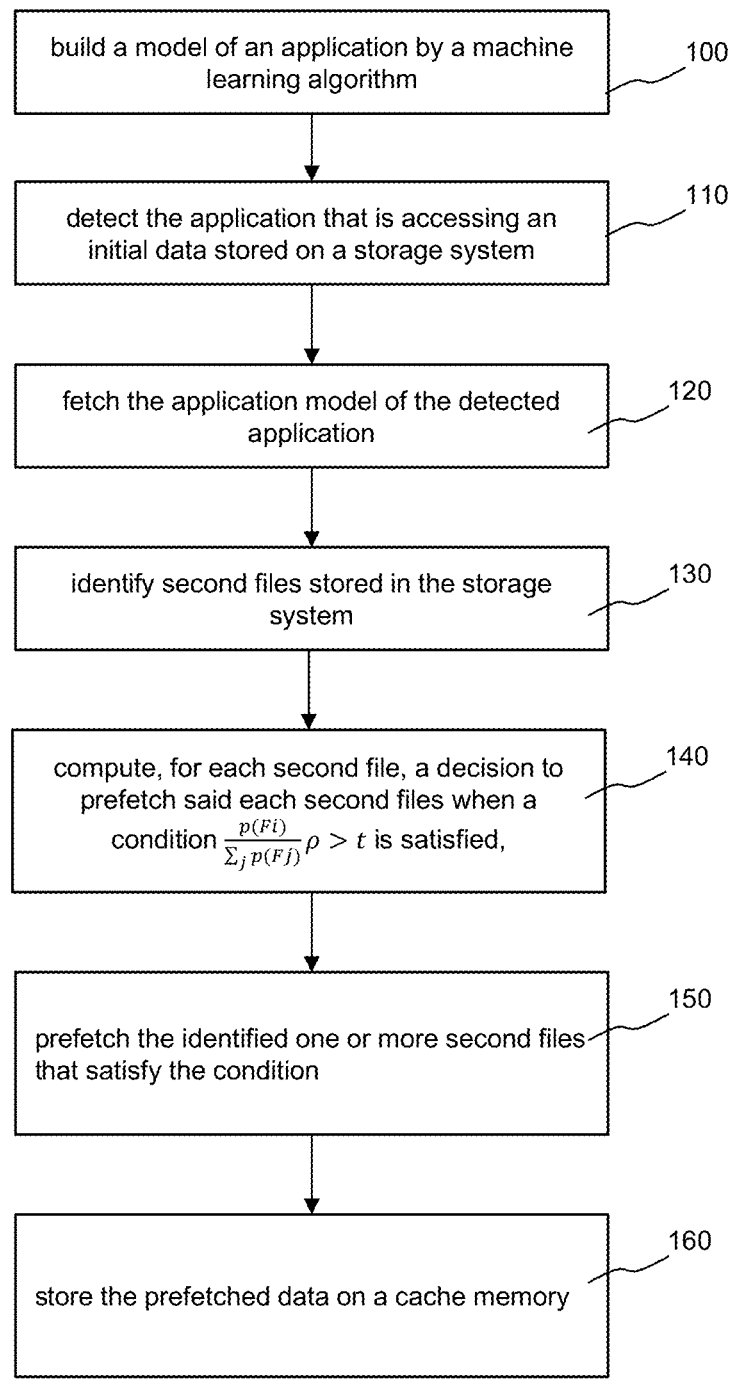
FIG. 1 shows a schematic block diagram of an embodiment of a method for accessing data by an application.

Building on this idea, a general aspect of the invention is now described in reference to FIG. 1, which concerns a method of accessing data by an application in a big data system. Big data system is an expression for data sets so large or complex that traditional data processing applications are inadequate; notably, the use of predictive analytics is required to extract data. Application (or application software) is a computer program or a set of computer program, that is, a sequence of instructions executed by a computer system to perform a specified task.

The embodiment of the method according to the invention depicted on FIG. 1 broadly decomposes as a build time (comprising step 100) and a run time (step 110-160).

The build time notably comprises a pre-processing step 100, mainly dedicated to the building, for each application, of an application model. The build time is also referred to as offline part of the method as no prefetching to the storage system is performed for the application.

The run time is mainly dedicated to the management of access request from the application to the storage system and the prefetching of data. The run time is also referred to as online part of the method.

The embodiment of the method illustrated on FIG. 1 starts with a build time 100 which is used for training and learning application access behavior. The result of this training and learning is stored in an application model associated with an application. Hence, in the event several application are likely to access data stored on the storage system, at least one application model is computed for each application. The application model is obtained by associating access patterns of the application when accessing given data with metadata associated with the given data the application is accessing. It represents general repeatable access patterns of the application that access given types of data represented by metadata.

Figure 2:
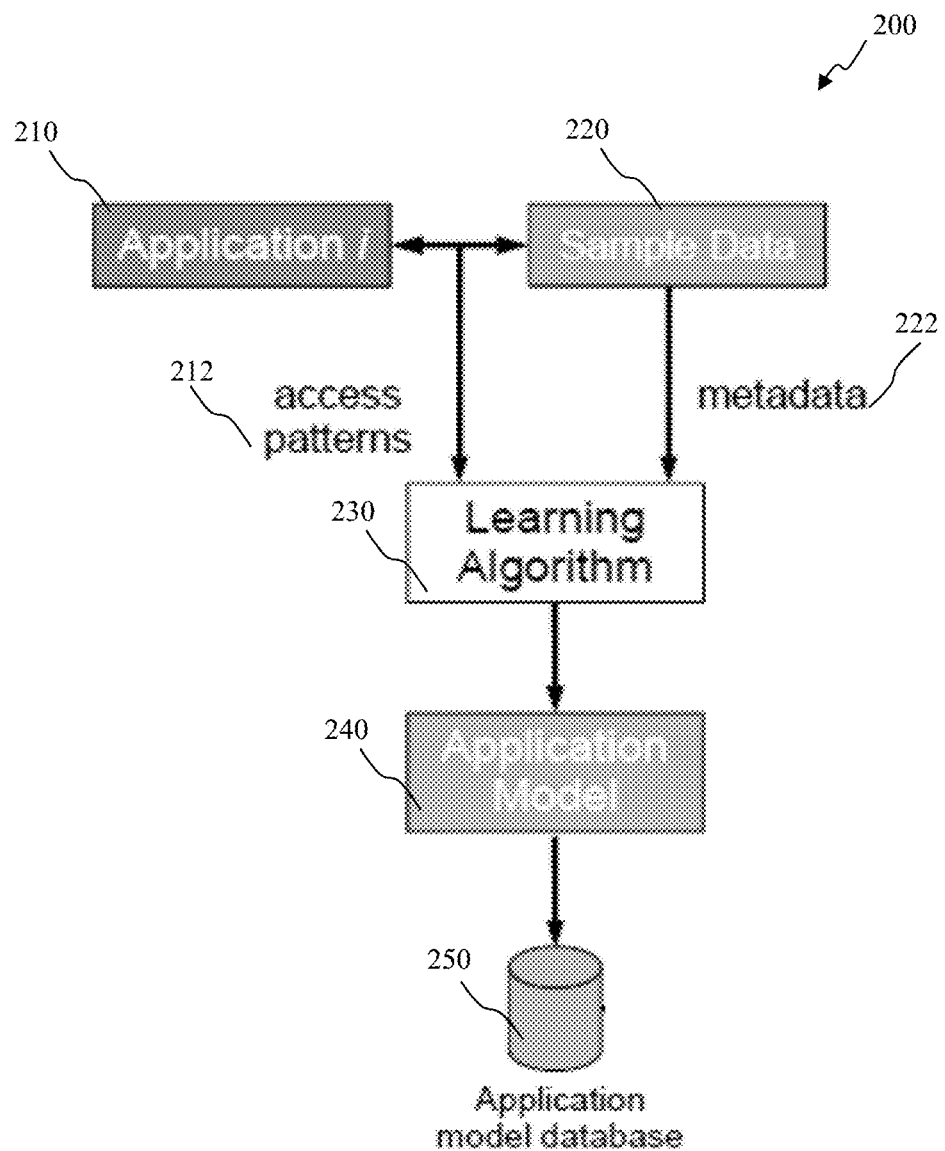
FIG. 2 shows a schematic block diagram of an embodiment of a system for computing application model.

Referring to FIG. 2, it is shown a block diagram of an embodiment of a computer-implemented system 200 used for training and learning access behavior of an application 210, e.g. the application is a pdf file reader. The application is run on a set of sample data 220. The sample data consist of a set of training examples used to simulate real world condition so that the learning algorithm 230 can infer the application model 240 from the sample data. In this example, the sample data might be limited to different types of pdf files if the application is a pdf file reader.

Metadata of sample data are extracted. Metadata are the data providing information about one or more aspects of the sample data, such as, but is not limited to: owner of the data, owner's group of the data, path of the data, encoding of the data, date of creation of the data, date of last modification of the data, date of last access of the data. The extraction of metadata from the sample data is performed as known in the art. Furthermore, domain-dependent metadata may also be extracted. Domain-dependent metadata are metadata that characterize the meaning and/or the usage of the underlying sample data such as, but is not limited to, the geolocation tags and camera information for photos, astronomical sources in sky images, authors and titles of documents, content of the documents, etc. For instance, metadata extracted from a pdf file might be the creation and the last modification dates, and domain-dependent metadata extracted from the pdf file might be the content of the file (e.g. text and images), the language of the text (e.g. English).

The extraction of access patterns of the application on the sample data is performed as known in the art. For instance, the Linux strace utility is an instrumentation tool that can be used for recording the input/output of the run of the application on the sample data; being understood one can use any tool adapted to intercept and record the system calls which are called by the application and the signals which are received by the application. The extracted access patterns comprise, for instance, on whether or not a file was accessed, the sequentially of accesses, the rate of I/O requests to a sample data, the size of I/O requests to a sample data, etc. Preferably, the obtained access patterns comprise a number of predetermined types of parameter associated with return values that are obtained from the extraction.

The access patterns 212 of the runs of the application on the sample data and the metadata 222 of the sample data 220 are preferably recorded before being sent to a machine learning algorithm that runs the learning algorithm 230 producing the application model. This allows later analysis of already known access patterns and metadata without repeating metadata and access patterns extractions.

The learning algorithm 230 receives the access pattern and metadata, and creates associations between the extracted access patterns and metadata. Interestingly, the associations may be created upon the computation of correlations between the access pattern and metadata associated with the files (here the sample files). Thus, the machine learning that runs the learning algorithm 230 aims at gathering access patterns according to the extracted metadata so that a reasonable access pattern can be provided for all possible data an application is likely to access in a near future.

Several learning algorithms can be used for performing the correlation between the access pattern and metadata associated with the files. For example, the machine learning algorithm may be an agglomerative information bottleneck algorithm. The information bottleneck method, introduced in "N. Tishby, F. C. Pereira, and W. Bialek. *The information bottleneck method. In The 37'th Allerton Conference on Communication, Control, and Computing*, 1999", is an information theoretic framework that attempts to find a simple representation of one random variable X through an auxiliary variable T, which is relevant to another random variable Y. In the present invention, the variable X is taken as the metadata of the sample files, the variable Y as the access patterns of the application. The variable T will be metadata-clusters (i.e., groups of metadata words in files with similar access patterns), which will later be used as features during prediction. Let W be the set of metadata words (e.g., file path, file owner, data of creation) occurring in the metadata of the sample data and let C be the set of access pattern types observed in the sample runs of an application. Then, for every metadata word w∈W and every access pattern type c∈C we can define the empirical joint probability distribution $$p(c, w) = n(c, w) / \left( \sum_{c \in C} \sum_{w \in W} n(c, w) \right),$$

where n(c,w) is the number of occurrences of the word w in the metadata of files with access pattern type c. If two different metadata words have similar distributions, p(c|w), over the access pattern types, they will play a similar role in the access pattern prediction and therefore could be clustered together. The agglomerative information bottleneck algorithm clusters the set of metadata words W into a set of word-clusters W' where each word-cluster w'∈W' is a subset of W. The corresponding empirical joint distribution p(c,w') is also obtained as follows:

$$p(c, w') = \sum_{w \in w'} p(c, w).$$

The word-clusters together with the above joint distribution p(c,w') constitute an application model when the agglomerative information bottleneck algorithm is used as the machine learning algorithm.

An application model 240 for the application running on the data sample is provided at the output of the machine learning, and is stored on an application model database 250. In practice, the application model is a file and the application model database a file repository that can be accessed by applications accessing data of the storage repository.

The build time 100 of FIG. 1 has been described in relation with FIG. 2 for the basic case one application is running on the sample data. In practice, several different applications are likely to access the multi-tiered storage of the big data system, and an application model has to be computed for each application. For instance, consider an embodiment wherein the sample data consists of a set of n files $\{F_1, F_2, \ldots, F_n\}$ and there is a set of m applications $\{A_1, A_2, \ldots, A_m\}$ that may be run on the data stored in the big data system. Each application $A_i$ is run on all n sample files and an I/O trace of the run is obtained, e.g., using the Linux strace utility. The I/O trace is then used to classify each of the files into one of a set of k pre-defined access patterns $\{P_1, P_2, \ldots, P_k\}$. For example, a simple set of access patterns could be {Not Accessed, Accessed} or {Not Accessed, Sequentially Accessed, Randomly Accessed}.

Figure 3:
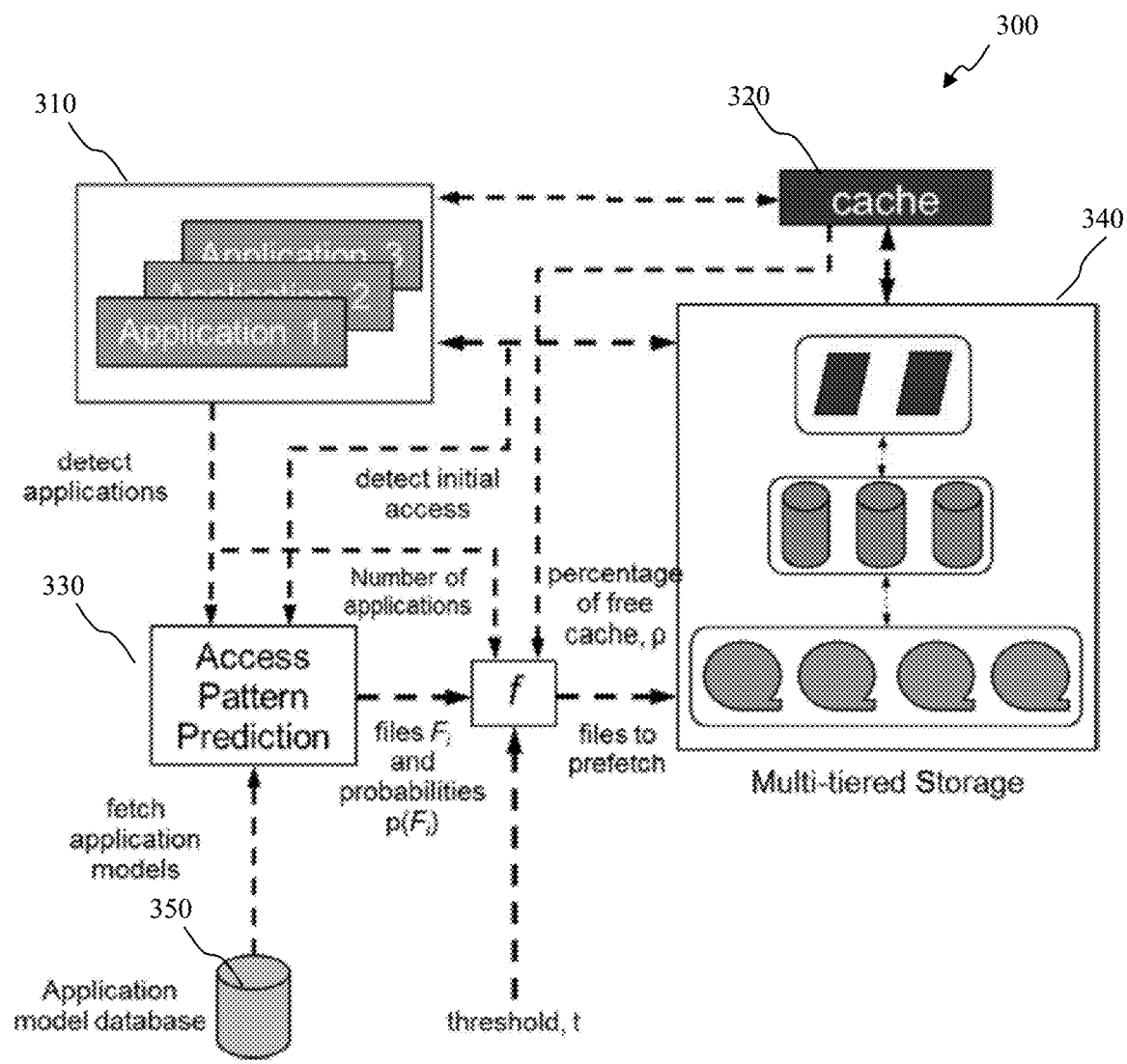
FIG. 3 shows a schematic block diagram of an embodiment of a system for accessing data by an application.

Referring now to references 110-160 of FIG. 1 and FIG. 3, it is discussed the run-time of an embodiment of the present invention. In this embodiment, files are accessed and prefetched from the storage system. More generally, any kind of data structure can be used, and it might be simply referred to as data.

An application is detected 110 that is accessing an initial data (e.g. a file) stored on a storage system. The storage system is typically part of a big data system. For instance, the storage system may be a multi-tiered storage wherein different categories of data are assigned to different types of storage media in order to reduce total storage cost. As an example of tiered storage, mission-critical files can be stored on expensive and high-quality media, while rarely used files can be stored on tape. The detection 110 may be performed in two steps. In a first step, one detects an application call, and in second step the initial file access is detected. This ensures that the call of the application that is detected by the system is related to an access request to data of the storage system. The detection of the application and the initial file access is performed as known in the art; for instance a call of a process of the application is detected and a call of this process that is directed to the storage system is also detected.

Then, the appropriate application model of the detected application is fetched 120. The application model allows the system to predict the files that should be used by the application in the near future, as described above in reference to FIG. 2.

Next, one or more second files are identified 130 in the storage system. The identification of the said second files is performed by use of the application model of the detected application that was previously fetched (120). The application model provides access patterns of the application as a result of the training and learning application access behavior. Thus, the one or more second files associated with metadata information that is similar to the sample files can be identified by using the knowledge provided by the application model. In practice, this means that the metadata of the second files is also similar to the metadata information of the initial files(s) accessed by the application (110). The similarity between the metadata information associated with one of the second files and the metadata information used for the creation of the application is measured in term of a distance metric, wherein the term distance metric refers to a function that defines a distance between each pair of elements of a set. For instance, metadata information typically comprises a file that may be structured using XML syntax, and the similarity between two metadata files may comprise the determination of common information comprised in tags or elements or attributes of the two metadata files. If the agglomerative information bottleneck algorithm is used, the probability p(c|F') that a second file F' would have an access pattern c is computed from the application model as follows: given a file F' with a set of metadata words $\{w1, \ldots, wn\}$, let $\{w1', \ldots, wn'\}$ be the set of word-clusters in the application model to which the metadata words belong. Then, $$p(c|F') = \left(p(c)\prod_{i=1}^{n} p(wi')\right)\prod_{j=1}^{n} p(wj'|c),$$

wherein the quantities p(c), p(wi'), and p(wj'|c) are obtained from the joint distribution p(c,w') stored in the application model.

The prediction of the next files likely to be accessed by the application in a near future is obtained from the application model. However, the number of hits may be huge depending on the application and the application model so that prefetching the second files can be wasteful. Several filtering strategies may be implemented to improve the selection of the second files to be prefetched in a next step. It is to be understood that these filtering strategies may be used only when the number of second files identified excesses a predetermined threshold.

In an embodiment, one restricts the prefetching of second files to a reasonably sized subset of the said second files by applying a dynamic filter: files lying within a certain distance metric from the initial accessed file that was previously detected, are retained. Said otherwise, a degree of similarity is measured between the accessed initial file and the identified second files, and the prefetching of the identified second files depends on the result of the measured degree of similarity. For example, in the case the detected application is a pdf file reader, the dynamic filtering may restrict the prefetching to only the ".pdf" files within the same directory as the initially accessed file; here the directory in the storage system is the common information between the metadata file of the initial file and the metadata file of each second file. As another example, the creation times within the same day as the initially accessed file or the same file owner as the initially accessed file might be retained as distance criterion. It is to be understood that one or several information elements may be used for measuring the distance between the accessed initial file(s) and the second files to be prefetched.

In another embodiment, one restricts the prefetching of second files to a reasonably sized subset of the said second files by associating a prediction confidence to each second file to be prefetched, so that a subset of files to be prefetched will be created with files associated with a prediction confidence that exceeds a predetermined confidence. This allows to prevent the system from wasting resources on files that are unlikely to be accessed. In practice, the prediction confidence associated with a file is represented by a percentage comprised between 0 and 100%. This prediction confidence provides an estimate of the likelihood that a file will be accessed in the near future. The computation of the prediction confidence is performed as known in the art. For example, if the agglomerative information bottleneck algorithm is used to build the application model and the access pattern classes are {Not Accessed, Accessed}, the prediction confidence is given by the probability that the second file F' is accessed, that is, by p(Accessed|F'). Hereafter, when the access pattern classes are {Not Accessed, Accessed}, the probability p(Accessed|F') will be denoted simply as p(F').

In another embodiment, the dynamic filtering and the prediction confidence-based filtering may be combined, that is, prediction confidence is applied on second objects that have already been predicted with the application model and filtered using a dynamic filter.

In an embodiment (140), the set of the second files eligible to be prefetched is restricted by associating a probability of being accessed $p(F_i)$ in a next time period $\Delta T$ to each second file to be prefetched, and only second files associated with a probability that exceeds a predetermined probability can be prefetched. In practice, the probability to be accessed in $\Delta T$ is represented by a numerical value that is associated with each file of second files that have already been predicted by use of the application model. The computation of the probability $p(F_i)$ is performed as known in the art, e.g. the computed by using the application model.

Interestingly, the set of files $F_i$ associated with the probabilities of being accessed $p(F_i)$ in a next time period $\Delta T$ may be filtered by use of a function $f$ for selecting a subset of these files $F_i$ to prefetch. This function takes as input a threshold noted t, a percentage of free cache noted $\rho$, the outputs of the access pattern predictor, Fi and p(Fi), and gives as output a binary prefetching decision (prefetch or do not prefetch) for each file $F_i$. A decision to prefetch is made if the condition $$C = \frac{p(Fi)}{\sum_j p(Fj)} \rho > t$$

is satisfied. In addition, the number of applications noted m may be taken into account. Let $p_j(F_i)$ denote the probability that file $F_i$ will be accessed by application $A_j$. The probabilities $p_j(F_i)$ are computed for each of the m applications according to their respective application models. Then the probability $p(F_i)$ is given by $p(F_i)=1-\Pi_{j=1}^{m}(1-p_j(F_i))$ and the same condition $$C = \frac{p(Fi)}{\sum_j p(Fj)} \rho > t$$

with the new value of $p(F_i)$ is used to make the prefetching decision.

Thus, the decision to prefetch files relies in this embodiment on a prediction with the application model and a condition C that notably use the percentage of free cache $\rho$. A lower threshold t or a lower cache occupancy leads to prefetching a larger number of files, whereas a higher threshold t or a higher cache occupancy leads to prefetching only files that are highly likely to be accessed in the near future.

In another embodiment, the decision to prefetch, which is made based on the condition C, may be combined with one or more other filtering operations of the second files identified 130, e.g. dynamic filtering or the prediction confidence-based filtering.

Still in reference to the flowchart of FIG. 1, the identified and filtered one or more second files are prefetched 150. As the application may (or may not) request access to one or more of the files prefetched from the storage system, the prefetched files are stored on a memory 160, where the memory is a cache memory.

Referring now to FIG. 3, a block diagram is shown representing an embodiment of a computer-implement system 300 for prefetching one or more files that are likely to be accessed by an application 310, e.g. the application is the pdf file reader 210. A detector module detects that the pdf file reader 310 is currently accessing initial data stored (e.g. a pdf file) on a multi-tiered storage system 340. The detector module is further in change of the detection of the initial file access. The detector module is an independent software module part of the system 300. Alternatively, the detector module may belong to an access pattern predictor 330.

The system 300 also comprises an application model database 350 that stores at least one application model obtained during the build time 100. In practice, several applications 310 access the storage 340, and thus the database 350 stores several application models.

The system 300 further comprises the access pattern predictor 330. The access pattern predictor requests the application model of the detected application that is stored in the database 350 and is also in charge of predicting second files to prefetch from the application model. For example, if the application is a PDF document reader, by detecting the access patterns of this application the learning algorithm would have learnt that it accesses files with an extension ".pdf". This information is stored in the application model, which is fetched by the access pattern predictor when it detects that the PDF document reader is running. The access pattern predictor can further perform one or more filtering on the predicted second files. For instance, the access pattern predictor can, but is not limited to, perform dynamic filtering or the prediction confidence-based filtering as discussed above. It can also decide to prefetch file based on the condition C, as represented on FIG. 3. In the embodiment of FIG. 3, the access pattern predictor, after having detected the running applications and their initial accesses, and using this to determine files that are likely to be accessed in a next time period, it computes and verify if the condition C is verified for each file that is likely to be accessed. The access pattern predictor thus is able to ask the state of a memory (for instance a cache memory) that is used for storing prefetched files. The application(s) 310 can access the cache memory and retrieve one or more files stored there. The access pattern predictor is thus aware of the percentage of free cache memory $\rho$. A further aspect of the access pattern predictor is that when multiple applications 310 are running in parallel, it may prioritize the prefetching of files which may be required by more than one application. This prioritization further improves the efficiency of utilization of resources for prefetching.

The system 300 further comprises a prefetch module for retrieving from the storage identified the second data. In practice, the prefetch module is part of the access pattern predictor 330. Alternatively, the prefetch module is an independent software module part of the system 300. The prefetch module can access the cache memory and store one or more files there.

Computerized devices may be suitably designed for implementing embodiments of the present invention as described herein. In that respect, it may be appreciated that the methods described herein are largely non-interactive and automated. In exemplary embodiments, the methods described herein may be implemented either in an interactive, partly-interactive or non-interactive system. The methods described herein may be implemented in software (e.g., firmware), hardware, or a combination thereof. In exemplary embodiments, the methods described herein are implemented in software, as an executable program, the latter executed by suitable digital processing devices. In further exemplary embodiments, at least one step or all steps of the methods of FIGS. 1 to 3 may be implemented in software, as an executable program, the latter executed by suitable digital processing devices. More generally, embodiments of the present invention may be implemented wherein general-purpose digital computers, such as personal computers, workstations, etc., are used.

Figure 4:
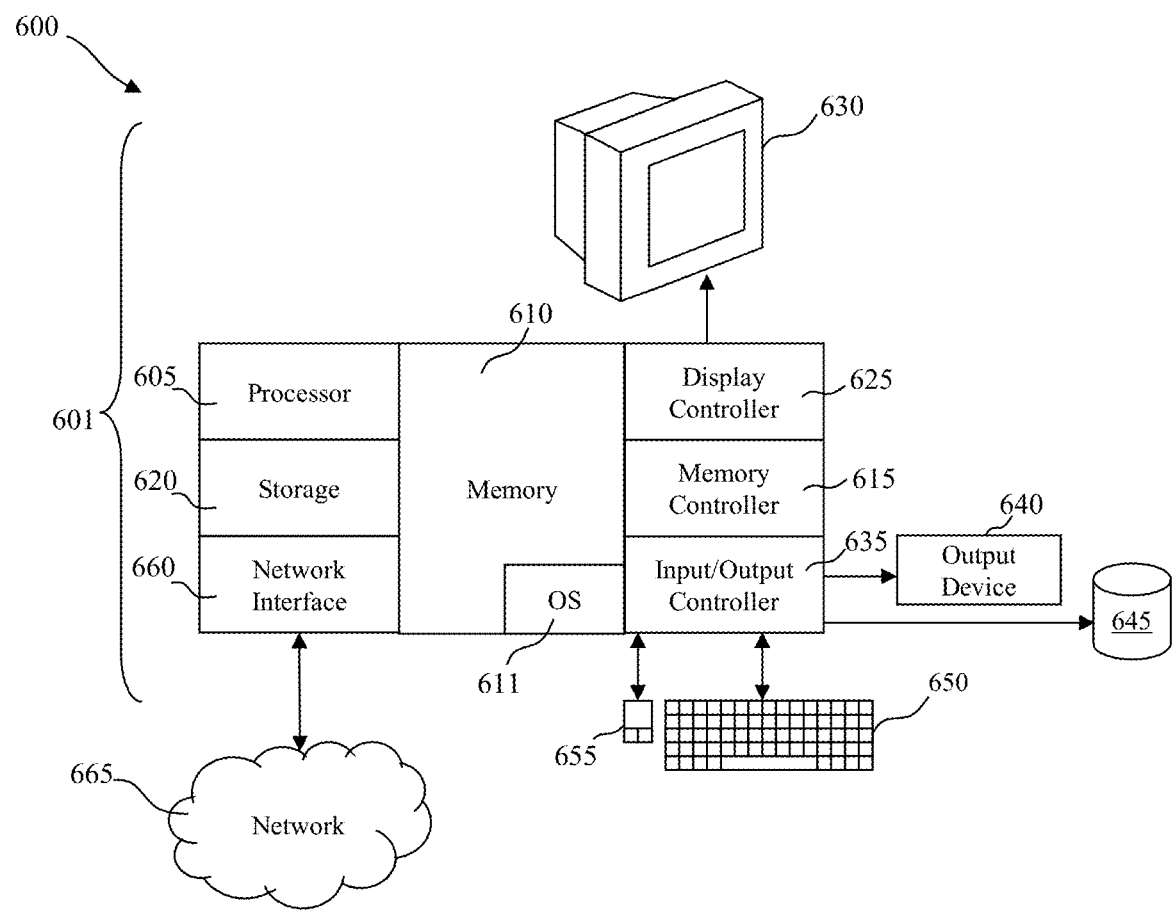
FIG. 4 shows a schematic block diagram of a computer-implemented system.

For instance, the system 600 depicted in FIG. 4 schematically represents a computerized unit 601, e.g., a general-purpose computer. In exemplary embodiments, in terms of hardware architecture, as shown in FIG. 4, the unit 601 includes a processor 605, memory 610 coupled to a memory controller 615, and one or more input and/or output (I/O) devices 640, 645, 650, 655 (or peripherals) that are communicatively coupled via a local input/output controller 635. Further, the input/output controller 635 may be, but is not limited to, one or more buses or other wired or wireless connections, as is known in the art. The input/output controller 635 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 605 is a hardware device for executing software, particularly that stored in memory 610. The processor 605 may be any custom made or commercially available processor, a central processing unit (CPU), an auxiliary processor among several processors associated with the computer 601, a semiconductor based microprocessor (in the form of a microchip or chip set), or generally any device for executing software instructions.

The memory 610 may include any one or combination of volatile memory elements (e.g., random access memory) and nonvolatile memory elements. Moreover, the memory 610 may incorporate electronic, magnetic, optical, and/or other types of storage media. Note that the memory 610 may have a distributed architecture, where various components are situated remote from one another, but may be accessed by the processor 605.

The software in memory 610 may include one or more separate programs, each of which comprises an ordered listing of executable instructions for implementing logical functions. In the example of FIG. 4, the software in the memory 610 includes a method described herein in accordance with exemplary embodiments and a suitable operating system (OS) 611. The OS 611 essentially controls the execution of other computer programs, it being noted that methods described herein (e.g., FIGS. 1 to 3) may be partly implemented as application program, and provides scheduling, input-output control, file and data management, memory management, and communication control and related services.

The methods described herein may be in the form of a source program, executable program (object code), script, or any other entity comprising a set of instructions to be performed. When in a source program form, then the program needs to be translated via a compiler, assembler, interpreter, or the like, as known per se, which may or may not be included within the memory 610, so as to operate properly in connection with the OS 611. Furthermore, the methods may be written as an object oriented programming language, which has classes of data and methods, or a procedure programming language, which has routines, subroutines, and/or functions.

Possibly, a conventional keyboard 650 and mouse 655 may be coupled to the input/output controller 635. Other I/O devices 640-655 may include sensors (especially in the case of network elements), i.e., hardware devices that produce a measurable response to a change in a physical condition like temperature or pressure (physical data to be monitored). Typically, the analog signal produced by the sensors is digitized by an analog-to-digital converter and sent to controllers 635 for further processing. Sensor nodes are ideally small, consume low energy, are autonomous and operate unattended.

In addition, the I/O devices 640-655 may further include devices that communicate both inputs and outputs. The system 600 may further include a display controller 625 coupled to a display 630. In exemplary embodiments, the system 600 may further include a network interface or transceiver 660 for coupling to a network 665.

The network 665 transmits and receives data between the unit 601 and external systems. The network 665 is possibly implemented in a wireless fashion, e.g., using wireless protocols and technologies, such as WiFi, WiMax, etc. The network 665 may be a fixed wireless network, a wireless local area network (LAN), a wireless wide area network (WAN) a personal area network (PAN), a virtual private network (VPN), intranet or other suitable network system and includes equipment for receiving and transmitting signals.

The network 665 may also be an IP-based network for communication between the unit 601 and any external server, client and the like via a broadband connection. In exemplary embodiments, network 665 may be a managed IP network administered by a service provider. Besides, the network 665 may be a packet-switched network such as a LAN, WAN, Internet network, etc.

If the unit 601 is a PC, workstation, intelligent device or the like, the software in the memory 610 may further include a basic input output system (BIOS). The BIOS is stored in ROM so that the BIOS may be executed when the computer 601 is activated.

When the unit 601 is in operation, the processor 605 is configured to execute software stored within the memory 610, to communicate data to and from the memory 610, and to generally control operations of the computer 601 pursuant to the software. The method described herein and the OS 611, in whole or in part are read by the processor 605, typically buffered within the processor 605, and then executed. When the methods described herein (e.g. with reference to FIGS. 1 to 3) are implemented in software, the methods may be stored on any computer readable medium, such as storage 620, for use by or in connection with any computer related system or method.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects. Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the unit 601, partly thereon, partly on a unit 601 and another unit 601, similar or not.

Aspects of the present invention are described above with reference to flowchart illustrations and/or block diagrams of methods, apparatus (systems) and computer program products according to embodiments of the invention. It will be understood that each block of the flowchart illustrations and/or block diagrams may be implemented by one or more computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved and algorithm optimization. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

More generally, while the present invention has been described with reference to certain embodiments, it will be understood by those skilled in the art that various changes may be made and equivalents may be substituted without departing from the scope of the present invention. In addition, many modifications may be made to adapt a particular situation to the teachings of the present invention without departing from its scope. For instance, each application model may be continually improved using the learning algorithm by monitoring the access patterns of the application and comparing the actual access patterns with the predicted access patterns.

Therefore, it is intended that the present invention not be limited to the particular embodiments disclosed, but that the present invention will include all embodiments falling within the scope of the appended claims.

REFERENCE LIST

100 device
600 system
601 computerized unit
605 processor
610 memory
611 operating system (OS)
615 memory controller
620 storage
625 display controller
640 display
645, 650, 655 input and/or output (I/O) devices
635 local input/output controller
650 keyboard
655 mouse
660 network interface or transceiver
665 network

What is claimed is:

1. A computer-implemented method of accelerating access to data in a storage system by an application, comprising:
   detecting the application accessing an initial file stored in the storage system;
   fetching, from an application model database, an application model of the application in response to detecting the access of the initial file, the application model comprising an access pattern of the application when previously accessing first files having first metadata information similar to metadata information of the initial file;
   identifying one or more second files stored in the storage system and having second metadata information that are similar to the first metadata information;

filtering the one or more second files by associating a prediction confidence to each second file to be prefetched, according to the access pattern of the application model;
prioritizing prefetching of files that are required by more than one application; and
prefetching from cold storage to cache memory, according to the prioritizing, those of the one or more second files for which the prediction confidence exceeds a predetermined confidence threshold.

2. The method of claim 1, further comprising before detecting the application:
building, in the application model database, the application model of the application based on access patterns of the application when accessing first files with first metadata information of the first files.

3. The method of claim 2, wherein a machine learning algorithm builds the application model of the application by computing correlations between access patterns of the application accessing first files and first metadata information of the first files that are accessed.

4. The method of claim 3, wherein the machine learning algorithm is an agglomerative information bottleneck algorithm.

5. The method of claim 1, wherein identifying the one or more second files further comprises determining, for each second file to be prefetched, a degree of similarity between its second metadata information and metadata information of the initial file, and prefetching the identified one or more second files further comprises prefetching the identified one or more second files that exceeds a predetermined degree of similarity.

6. The method of claim 1, wherein metadata associated with a file include at least one among data owner, data owner's group, data path, data encoding, date of creation of the data, date of last modification of the data, date of last access of the data.

7. The method of claim 1, wherein metadata further comprises domain-dependent metadata.

8. A computer-implemented system for accelerating access to data in a storage system by an application, the system comprising:
a detector that is configured to detect the application accessing an initial file stored on the storage system;
an application model database that is configured to store an application model of the application, the application model comprising an access pattern of the application when previously accessing first files that have first metadata information similar to metadata information of the initial file;
an access pattern predictor that is configured to identify one or more second files stored in the storage system, the one or more second files having second metadata information that are similar to the first metadata information, and that filters the one or more second files by associating a prediction confidence to each second file to be prefetched, according to the access pattern of the application model;
a prefetcher that is configured to prioritize prefetching of files that are required by more than one application and to prefetch from cold storage to cache memory, according to the prioritizing, those of the one or more second files for which the prediction confidence exceeds a predetermined confidence threshold; and
a memory that is configured to store the one or more second files that are prefetched.

9. The computer-implemented system of claim 8, wherein the access pattern predictor is configured to determine, for each second file to be prefetched, a degree of similarity between its second metadata information and metadata information of the initial file, and the prefetcher prefetches second files that exceed a predetermined degree of similarity.

10. The computer-implemented system of claim 8, further comprising:
a machine learning algorithm that computes correlations between access patterns of the application accessing first files and first metadata of the first files that are accessed and builds an application model from the computed correlations,
wherein the first metadata includes data owner, data owner's group, data path, data encoding, date of creation of the data, date of last modification of the data, date of last access of the data, domain-dependent metadata.

11. The computer-implemented system of claim 10, wherein the machine learning computes the correlation with an agglomerative information bottleneck algorithm.

12. The computer-implemented system of claim 10, wherein the machine learning continuously updates the application model by comparing the identified access patterns with the actual access patterns.

13. A computer program product for accelerating access to data in a storage system by an application, the computer program product comprising a computer readable non-transitory storage medium embodying program instructions, the program instructions being executable by a computerized system to cause:
detecting the application accessing an initial file stored on the storage system;
fetching, from an application model database, an application model of the application in response to detecting the access of the initial file, the application model comprising an access pattern of the application when previously accessing first files having first metadata information similar to metadata information of the initial file;
identifying one or more second files stored in the storage system, the identified one or more second files having second metadata information that are similar to the first metadata information;
filtering the one or more second files by associating a prediction confidence to each second file to be prefetched, according to the access pattern of the application model;
prioritizing prefetching of files that are required by more than one application; and
prefetching from cold storage to cache memory, according to the prioritizing, those of the one or more second files for which the prediction confidence exceeds a predetermined confidence threshold.

\* \* \* \* \*